US008632648B2

(12) United States Patent
Schuler

(10) Patent No.: US 8,632,648 B2
(45) **Date of Patent: *Jan. 21, 2014**

(54) METHOD AND DEVICE FOR THE ASSEMBLY OF INSULATING GLASS PANES THAT ARE FILLED WITH A GAS DIFFERENT FROM AIR

(76) Inventor: Peter Schuler, Tiefenbronn (DE)

( * ) Notice: Subject to any disclaimer, the term of this patent is extended or adjusted under 35 U.S.C. 154(b) by 1177 days.

This patent is subject to a terminal disclaimer.

(21) Appl. No.: 11/631,531

(22) PCT Filed: Jul. 5, 2005

(86) PCT No.: PCT/EP2005/007219

§ 371 (c)(1),
(2), (4) Date: Sep. 6, 2007

(87) PCT Pub. No.: WO2006/002975

PCT Pub. Date: Jan. 12, 2006

(65) Prior Publication Data

US 2007/0295441 A1 Dec. 27, 2007

(30) Foreign Application Priority Data

Jul. 5, 2004 (DE) ......................... 10 2004 032 435

(51) Int. Cl.
*B32B 17/00* (2006.01)

(52) U.S. Cl.
USPC .............. 156/99; 156/103; 156/105; 156/109

(58) Field of Classification Search
USPC ....................... 156/99–109; 52/786.13, 786.1
See application file for complete search history.

(56) References Cited

U.S. PATENT DOCUMENTS

| | | | |
|---|---|---|---|
| 5,626,712 | A | 5/1997 | Lisec et al. |
| 5,645,678 | A | 7/1997 | Lisec |
| 5,676,782 | A | 10/1997 | Lisec et al. |

FOREIGN PATENT DOCUMENTS

| | | |
|---|---|---|
| CA | 2555828 | 9/2005 |
| CA | 2557119 | 9/2005 |
| EP | 0615044 B1 | 9/1994 |
| EP | 0674086 A1 | 9/1995 |
| EP | 1063383 A2 | 3/2000 |

*Primary Examiner* — Christopher Schatz

(74) *Attorney, Agent, or Firm* — Keith H. Orum; Orum & Roth, LLC

(57) ABSTRACT

Disclosed is a method for assembling insulating glass panes filled with a gas other than air. According to said method, two glass sheets provided with a spacer are arranged in a vertical or inclined position and facing each other, gas that is different from air is introduced into a chamber from below and the insulating glass pane is formed by moving the glass sheets closer to each other after reaching a desired gas filling level. According to the invention, the gas is homogenized before said gas is introduced through said gap.

18 Claims, 10 Drawing Sheets

METHOD AND DEVICE FOR THE ASSEMBLY OF INSULATING GLASS PANES THAT ARE FILLED WITH A GAS DIFFERENT FROM AIR

The present invention relates to a method having the features defined in the preamble of Claim 1 and to a device having the features defined in the preamble of Claim 20. A method of that kind and a device for carrying out such a method are known from EP 0 674 086 A1. In the case of the known method, a first glass panel and a second glass panel, carrying a spacer, are placed upright on a horizontal conveyor that uses a belt as a conveying element, and are fed in upright position into the space between two pressure plates arranged at a variable spacing. Between the pressure plates, the glass panels are positioned in parallel and in registration one to the other so that a continuous open gap remains around the spacer and the glass panel arranged opposite to it. Adjacent the vertical edges of the glass panels arranged in this way, seals are provided which are active between the pressure plates and which extend as far as to the upper run of the belt, which latter closes the space between the glass panels placed on them toward the bottom. The heavy gas is introduced into the chamber defined by the belt, the glass panels, the two pressure plates and the vertical seals acting between the plates. The heavy gas rises in the chamber and its supply is stopped when a predefined filling level is reached. Then one of the pressure plates is approached to the other pressure plate for closing the insulating glass pane.

With respect to the introduction of the heavy gas, different possibilities are described in EP 0 674 086 A1:

The heavy gas is supplied either through openings in the vertical seals or through the belt that serves as conveying element. Both solutions are connected with disadvantages. When the heavy gas is supplied through openings in the vertical seals, movable gas supply devices, coupled with the movable seals, are needed which requires some apparatus input and which complicates the structure of the seals. Further, when the heavy gas is introduced through openings in the vertical seals, arranged at the forward and the rear edges of the two glass panels, it is difficult to uniformly displace the air between the glass panels toward the top, and that difficulty increases with the length of the glass panels. Introducing heavy gas through the belt is disadvantageous because that solution counteracts the main object of the belt, namely to transport the glass panels and to close off tightly the space between the glass panels toward the bottom. EP 0 674 086 A1 does not disclose any practical possibility of supplying the heavy gas through a uniform belt. It describes a solution where two belts are arranged at a spacing one relative to the other on a channel, which is provided with upwardly directed openings arranged between the two belts. Heavy gas supplied through the channel is permitted to rise through the openings between the belts into the space between the glass panels. It is a disadvantage of that solution that two separate belts have to be sealed and that the horizontal conveyor must permit transverse displacement in order to be adapted to glass panels of different thickness and to insulating glass panes of different thickness.

Now, it is the object of the present invention to show how insulating glass panes, positioned between two plates of a vertical assembly device for insulating glass panes, can be filled with a gas different from air at little expense, uniformly and to a high filling level, and can then be closed.

This object is achieved by a method having the features defined in Claim 1 and by a device having the features defined in Claim 20. Advantageous further developments of the invention are defined in the sub-claims.

According to the invention, the insulating glass panes, instead of being filled with a gas different from air and of being assembled in horizontal condition, are filled and assembled in vertical or in an inclined position so that the gas different from air, especially a heavy gas with a specific weight greater than air, such as argon, can be introduced into the lower area of the insulating glass pane to be produced and can displace the air initially present between the conveying elements toward the top. If the flow is adequately slow and uniform, the air, having a lower specific weight, can be displaced toward the top floating on the heavier gas without getting excessively mixed with the heavy gas.

Production lines for insulating glass panes where the glass panels, from which the insulating glass panes are assembled, are transported in upright position and leaning against an inclined supporting device from one station of the production line to the next station of the production line, are generally described as "vertical" production lines.

In filling insulating glass panes with gas and assembling them from glass panels arranged in vertical or inclined position, the invention turns away from the prior art in that the glass panels, arranged in pairs one opposite the other, do not stand on one belt during the filling operation; instead, only one of the glass panels is in contact with the belt by its lower edge while a gap is formed between the belt and the lower edge of the other glass panel through which a gas different from air can be introduced into the space between the two glass panels. This provides essential advantages:

- The gap between the belt and the one glass panel (hereinafter referred to as the "first" glass panel) extends over the full length of the lower edge of the first glass panel.
- Accordingly, a gas different from air can be introduced over the full length of the glass panel arrangement.
- The gas therefore can rise uniformly from the bottom toward the top, over the full length of the glass panel arrangement.
- The invention is suited not only for insulating glass panes with a rectangular contour, but also for panes with a non-rectangular contour, for example with a triangular contour or with curved edge portions. Such insulating glass panes are described as model panes.
- For purposes of the invention, a uniform tight belt can be used.
- The belt may of course have a width greater than the thickness of the thickest insulating glass panes encountered in practice. Preferably, the belt has a width of between 100 mm and 140 mm.
- Due to the fact that the gap through which the gas different from air is supplied always extends at the lower edge of the first glass panel, substantially uniform conditions are encountered according to the invention when gas is filled into insulating glass panes of different thickness. The belt, which preferably is the conveying element of a horizontal conveyor, therefore doesn't need not be adapted to insulating glass panes of different thickness, or to glass panels of different thickness. This is an essential advantage compared with the prior art known from EP 0 674 086 A1 where the horizontal conveyor comprises two belts, running in parallel, between which the heavy gas rises from a supply channel. For, that known horizontal conveyor must be adapted to glass panels and insulating glass panes of different widths by transverse displacement.

The use of the uniform belt envisaged according to the invention permits the panel arrangement to be easily sealed in downward direction during the filling operation:

The belt in any case is in contact with the lower edge of the second glass panel and seals the arrangement in that area. The belt extends to the lower edge of the other glass panel and beyond that edge so that only the gap between the belt and the lower edge of the glass panel has to be sealed. This can be effected by an arrangement where the opening of a channel or an elongated nozzle, through which a gas different from air can be supplied, is provided at that gap. The channel or the nozzle can then be configured so as to close the gap between the belt and the lower edge of the respective glass panel on its rear side.

It is then possible, as known from the prior art, to provide seals adjacent the upright edges of the glass panel arrangement, which extend from a position above the belt down to the belt. The seals may be applied directly on the edges of the glass panels. In that case, it is also possible to carry out the gas-filling operation outside of a press for insulating glass panes. In most of the cases, however, the insulating glass panes are positioned between two pressure plates, for assembly of an insulating glass pane, the space between the glass panels is filled with gas different from air, and the insulating glass pane is assembled and pressed. Preferably the method according to the invention is carried out in a device for assembling and pressing insulating glass panes which comprises two plates, arranged at a variable spacing, between which the glass panels are positioned in pairs one opposite the other and are closed—if desired after the gas-filling operation—by approaching the two glass panels one to the other by reducing the spacing between the two panels, until the first glass panel comes to hit upon the spacer and to be bonded to the latter. A device of that kind normally comprises, near the lower edge of the plates, with a horizontal conveyor on which the glass panels are transported into the device in upright position, leaning against one of the plates, and on which the assembled insulating glass pane is discharged in upright position, leaning against one of the plates. According to the invention, the horizontal conveyor uses a belt as a conveying element.

Existing production lines for insulating glass panes can be retrofitted with a device according to the invention. Likewise, existing devices for filling in gas and for assembling insulating glass panes can be converted to a device according to the invention.

For carrying out the method according to the invention and for building a device according to the intention use can be made largely of components and assemblies that have already proven their value in prior-art production lines for insulating glass panes. This allows the invention to be implemented in practice at low cost.

The invention permits uniform filling of insulating glass panes with a gas different from air at high filling levels and with comparatively low losses of gas.

Carrying out the invention permits shorter cycle times to be reached than has been possible before.

If the method according to the invention is carried out between the plates of a "vertical" device for gas-filling and assembling insulating glass panes, as indicated in Claim 3, then seals arranged beside the upright edges of the glass panels may be applied to the edges of the glass panels or to the two plates at a certain distance from the edges of the glass panels. The possibility described last is preferred. Most conveniently, one positions a glass panel pair at one of the ends of the plates and applies one of the movable seals to those ends of the plates. The other movable seal can then be displaced between the plates in the conveying direction of the belt into a position beside the upright edges of the glass panel.

During the gas-filling operation, the glass panels should be placed opposite one to the other in such a way that they can be connected to a closed insulating glass pane by approaching the glass panels, especially by approaching the plates of the device for filling and assembling insulating glass panes, one to the other. Where the space between the plates of a press can be varied by displacement along a straight line, the glass panels can be positioned conformingly one parallel to the other already during the gas-filling operation.

The gap between the belt and the one glass panel, through which the gas different from air is filled in, can be formed in various ways. One such way consists in lifting the glass panel off the belt. Another possibility to form a spacing between the lower edge of the glass panel and the belt consists in pivoting the belt in downward direction, about an axis extending in parallel to the conveying direction, for which purpose a pivot angle of a few degrees will be sufficient.

In a gas-filling and assembling device for insulating glass panes, the plates usually are provided with holes through which air can be selectively blown out or drawn in. Blowing will produce an air cushion between the plate and a glass panel leaning against it, on which the panel can gently slide while being transported. For fixing a glass panel on such a plate, it is attached to the latter by suction. For lifting a glass panel off the belt, the glass'panel may initially be attached to the plate by suction and may then be lifted off by shortly lifting the plate, for example with the aid of pneumatic cylinders.

In order to permit the glass panels to be fixed on the plates, it is preferred that the panels are in surface contact with the plates. They can then be held in contact with the one or the other plate of the assembly device by suction.

For carrying out the invention, either the first glass panel or the second glass panel, provided with a spacer, may be positioned with its lower edge spaced a certain distance from the belt. Preferably, the first glass panel, which does not carry a spacer, is selected for that purpose. This permits the gas to flow into the space between the glass panels along the shortest possible path, directly behind the edge of the first glass panel, and the conditions encountered by the gas are always approximately the same, for all imaginable thicknesses of insulating glass panes.

For introducing the gas different from air into the space between the glass panels, it is generally possible to introduce an elongated nozzle laterally into the gap between the belt and the edge of the first glass panel, which latter has been arranged at a spacing from the belt. Instead of providing the single elongated nozzle it is, however, also possible to arrange a plurality of nozzles, that can be closed off separately, one behind the other in the conveying direction. This provides the advantage to permit the length of the nozzle arrangement to be adapted to the length of the insulating glass pane. The apparatus input necessary for displacing the nozzle arrangement can be avoided by providing, according to a further development of the invention, an elongated nozzle or an elongated arrangement of nozzles, that can be shut off individually, on the lower surface of each plate where that glass panel is positioned which is spaced from the belt during the gas-filling operation, i.e. especially the first glass panel. The supplying means for the gas will then always, for all imaginable formats of insulating glass panes, be positioned at the point where the gas can enter the space between the glass panels, without a separate advancing motion being required. By applying the belt against the bottom surface or a lower edge of the nozzle or the nozzle arrangement, that plate can then be sealed toward the bottom. By applying the belt against the bottom surface of the other plate, the latter likewise can be sealed toward the bottom, in which case an elongated seal, especially a sealing section of, preferably, hollow shape, may be additionally provided at the bottom of the plate, between the belt and the plate.

In an assembly device for insulating glass panes, both plates may be movable. A device having such an arrangement is illustrated in EP 0 615 044 A1. In usual assembly devices for insulating glass panes, however, only one of the two plates is movable, while the other is stationary. In that case, it is preferred according to the invention to supply the gas different from air through a nozzle arrangement provided on the movable plate. For, the movable plate is best suited for receiving and fixing the first glass panel, which is not yet provided with a spacer. In such a device, where one movable plate can be moved in parallel to itself and vertically to a stationary plate, two glass panels are positioned one opposite to the other by initially conveying the first glass panel, leaning against the stationary plate, and stopping that panel in a predetermined position. Thereafter, the movable plate moves toward the first glass panel, grips the latter by suction and then returns to its initial position together with the first glass panel attached to it. The second glass panel, leaning against the stationary plate, is transported into the device and positioned in registration with the first glass panel only upon completion of that process.

In a known vertical assembly device for insulating glass panes, the horizontal conveyor is aligned in such a way that a right angle is enclosed between its conveying element or conveying elements and the surface of the plates. This is the case also with the device known from EP 0 674 086 A1, where the upper run of the belt is aligned at a right angle relative to the plate surfaces facing each other so that the glass panels are in full-surface contact with the plates and are conveyed and positioned with their lower edges standing on the belt in full-surface contact.

In a device in which two glass panels are assembled between two flat plates and where the space between the panels is filled with a gas different from air, while the plates are arranged in vertical or in inclined position and a horizontal conveyor with endless belt is associated to the lower edge of the plates, the method according to the invention may be carried out with particular advantage as follows:

Initially, a first glass panel is conveyed into the space between the two plates of the device by intermittently driving the belt of the horizontal conveyor. During that operation, the first glass panel is positioned on the belt leaning flat against one of the two plates as it is conveyed into the space between the two plates.

In the space between the two plates, by stopping the drive of the belt, the first glass panel is placed in a position in which it still rests on the belt, leaning against one of the plates of the device; the respective plate will be described hereafter as the "first" plate. That position preferably is selected so that the forward upright edge of the glass panel extends at the forward upright edge of the plates of the device or that the rear upright edge of the glass panel extends at the rear upright edges of the plates of the device, preferably ending flush with the latter. The term "forward" edge is understood herein as describing the leading edge, related to the conveying direction of the horizontal conveyor. The term rear edge is understood herein as describing the trailing edge of the glass panel, related to the conveying direction of the horizontal conveyor.

The upper run of the belt, or the horizontal conveyor of which the belt is a part, can be pivoted about an axis parallel to its conveying direction from a first position, which will be described hereafter as its conveying position, into a second position, which will be described hereafter as its filling position. In its conveying position the upper run of the belt extends at a right angle or at an approximately right angle to the two plates of the device. This position is occupied by the horizontal conveyor when a glass panel of a glass panel arrangement or an assembled insulating glass pane are to be conveyed.

Once the first glass panel is in its predetermined position, as described above, the belt, or the horizontal conveyor of which the belt is a part, is pivoted from its conveying position into its filling position whereby the first glass panel is lifted. It then still rests on the belt, leaning against the first plate. The glass panel is then attached by suction to the first plate positioned opposite the first plate, for which purpose the second plate conveniently is brought into contact with the glass panel. Plates provided with holes through which air can be drawn in or blown out have been known in connection with devices for the assembly of insulating glass panes. Alternatively, it would likewise be possible, though more costly, to provide one or more suction elements in the second plate which can be extended from the second plate so that they get into contact with the first glass panel for attracting the latter by suction, whereafter they can be withdrawn for bringing the first glass panel into contact with the second plate. In any case, the first glass panel, having been gripped by suction, is to be removed from the first plate of the device and to be brought into a position opposite the first plate, leaning against the second plate. Thereafter, the belt or the horizontal conveyor is returned to its conveying position, and the second glass panel is conveyed, just as the first glass panel had been before, into the space between the two plates where it is placed in the same position which the first glass panel had occupied before. Fixed to the second glass panel, for example by an adhesive, is a frame-like spacer consisting, for example, of a hollow metal or plastic section, or of a rope of a thermoplastic material which may be extruded from a nozzle directly onto the second glass panel.

Once the second glass panel has been positioned the belt, or the horizontal conveyor of which it is a part, is pivoted from its conveying position into its filling position whereby the second glass panel is lifted until it occupies a position conforming to the first glass panel and opposite the latter.

As the horizontal conveyor is pivoted about an axis parallel to the conveying direction, its upper run no longer extends at a right angle to the plates of the device in the filling position so that in the filling position the belt is in contact with the lower edge of the second glass panel, but not with the lower edge of the first glass panel. Now, a gas different from air can be introduced into the space between the two glass panels through the gap formed between the lower edge of the first glass panel and the belt, for displacing the air present in the space toward the top. To this end, it is necessary to provide a chamber that encloses the space between the two glass panels and that is closed on three sides, namely toward the front, toward the bottom and toward the rear. Sealing toward the front and toward the rear can be effected, as in the prior art, by movable seals that extend in parallel to the forward and the rear edges of the plates and of which the one can be brought into contact with the forward or the rear edge of the plates on which the glass panels are positioned while the other seal is introduced into the space between the plates of the device and is positioned on, or in the neighborhood of, the upright edges found between the plates. Conveniently, the two upright seals stand on the upper run of the belt, extending in upward direction up to a predetermined height, preferably up to the upper edge of the plates.

Sealing the chamber at the bottom preferably is effected by pivoting the belt, or the horizontal conveyor of which it is a part, into its filling position. As the second glass panel stands on the belt while the latter is pivoted into its filling position, sealing already is achieved along the lower edge of the second glass panel, the seal being tight when an impermeable material, being suited also as sealing material, is selected for the belt or its upper surface. That seal can then be supplemented, on the side of the second glass panel, by an arrangement where the belt in its filling position is additionally in tight contact with the lower edge of the first plate of the device, which for this purpose preferably is provided on its lower edge with a seal extending in the conveying direction that may be formed by a profiled elastomer rope, especially a hollow profile, which is contacted by the belt or by a strip supporting the belt when the belt is pivoted into its filling position.

On the opposite first plate of the device, the chamber also has to be closed in the area of the gap through which the gas different from air is to be introduced. To this end, the elongated nozzle used for introducing the gas, or the elongated arrangement of a plurality of nozzles that can be separately shut off, is conveniently arranged in tight contact with the lower edge of the second plate, and when the horizontal conveyor is pivoted into its filling position, the upper run of the belt is applied tightly against the lower surface of the nozzle or the nozzle arrangement. The sealing effect can be assisted in this case by providing that the lower surface of the nozzle or the nozzle arrangement is provided with a coating, a rope or a hollow profile of a material suited for sealing purposes and extending in the conveying direction. Another advantageous solution consists in providing, on the lower surface of the nozzle or the nozzle arrangement, a flexible, elastically resilient wall extending over its full length against which the belt is resiliently applied when the horizontal conveyor is pivoted into its filling position. That embodiment offers advantages as regards the subsequent assembly of the insulating glass pane.

Once the horizontal conveyor is in its filling position and the chamber enclosing the space between the glass panels is closed on three sides, the gas different from air is delivered into the chamber from below through the nozzle or the nozzle arrangement so that it displaces the air from the chamber toward the top. When the desired filling level is reached, delivery of the gas different from air is stopped and the insulating glass pane is closed by reducing the spacing between the two plates until the two glass panels bond one to the other via the spacer. Simultaneously, the insulating glass pane is compressed between the two plates of the device to a predetermined thickness. Now, it is no longer necessary for the second plate of the device to hold the glass panel so that the suction applied on the latter can be stopped. The second plate is released from the first glass panel, the horizontal conveyor is lowered to its conveying position and the insulating glass pane, standing on the belt and leaning against the first plate of the device, is transported out of the device. During that operation, any air present between the first plate and the insulating glass pane for producing an air cushion on which the insulating glass pane can slide with little friction, being additionally secured in its position by the partial vacuum prevailing in the air cushion, can escape through openings provided in the first plate.

The described embodiment of the method according to the invention, and the device used for carrying out that method, distinguish themselves by simplicity, rapidity and high and uniform filling levels and permit insulating glass panes of high quality to be produced at lower cost than has been possible before.

The axis extending in parallel to the conveying direction about which the horizontal conveyor can be pivoted preferably is located below the plate on which the gap for introducing the gas different from air is formed. It thus can be ensured without any difficulty that, desirably, the upper run of the belt is lifted a smaller amount in the area of the first glass panel, where the filling operation is to be carried out along the lower edge, compared with the area of the second glass panel which, desirably, should not loose contact with the belt in the filling position. With a view to achieving that aim and also tight sealing it is especially favorable if the axis about which the horizontal conveyor is to be pivoted together with its belt can be pivoted about a second axis parallel to that axis.

In order to ensure that the conveying task and the sealing task can be efficiently performed by the belt, the upper run should be supported over its length. This can be achieved by a series of rollers, arranged in close succession, on which the belt runs. Preferably, the upper run of the belt is supported by a rail that permits the lower edge of the glass panels to be supported and sealed more efficiently.

As a rule insulating glass panes of different lengths are to be assembled and filled with a heavy gas in succession. Preferably, a channel, extending in the conveying direction and being subdivided into separate sections, is therefore provided in the device according to the invention for the supply of heavy gas. The gas can be supplied separately to the different sections into which the channel is subdivided, and each section of the channel communicates with one or more exit openings, which are exclusively associated to the respective section and which are arranged near the gap between the belt and the first glass panel, especially at the bottom of the respective plate neighboring the gap. In operation of the device, the gas is supplied only to those sections of the channel which have all their exit openings located beside the chamber to be filled.

Especially well suited as lengthwise seals are hoses, for example such hoses which due to their inherent elasticity can be compressed against the action of a restoring force, but especially hoses of a kind that can be inflated and retracted by evacuation.

One embodiment of the invention is shown in the attached drawings, partially in diagrammatic form. Those parts of the assembly device, which have been described as plates in the general part of the description, will be described as pressure plates in the description of the drawings, being suited for pressing the insulating glass panes.

Figure 1:
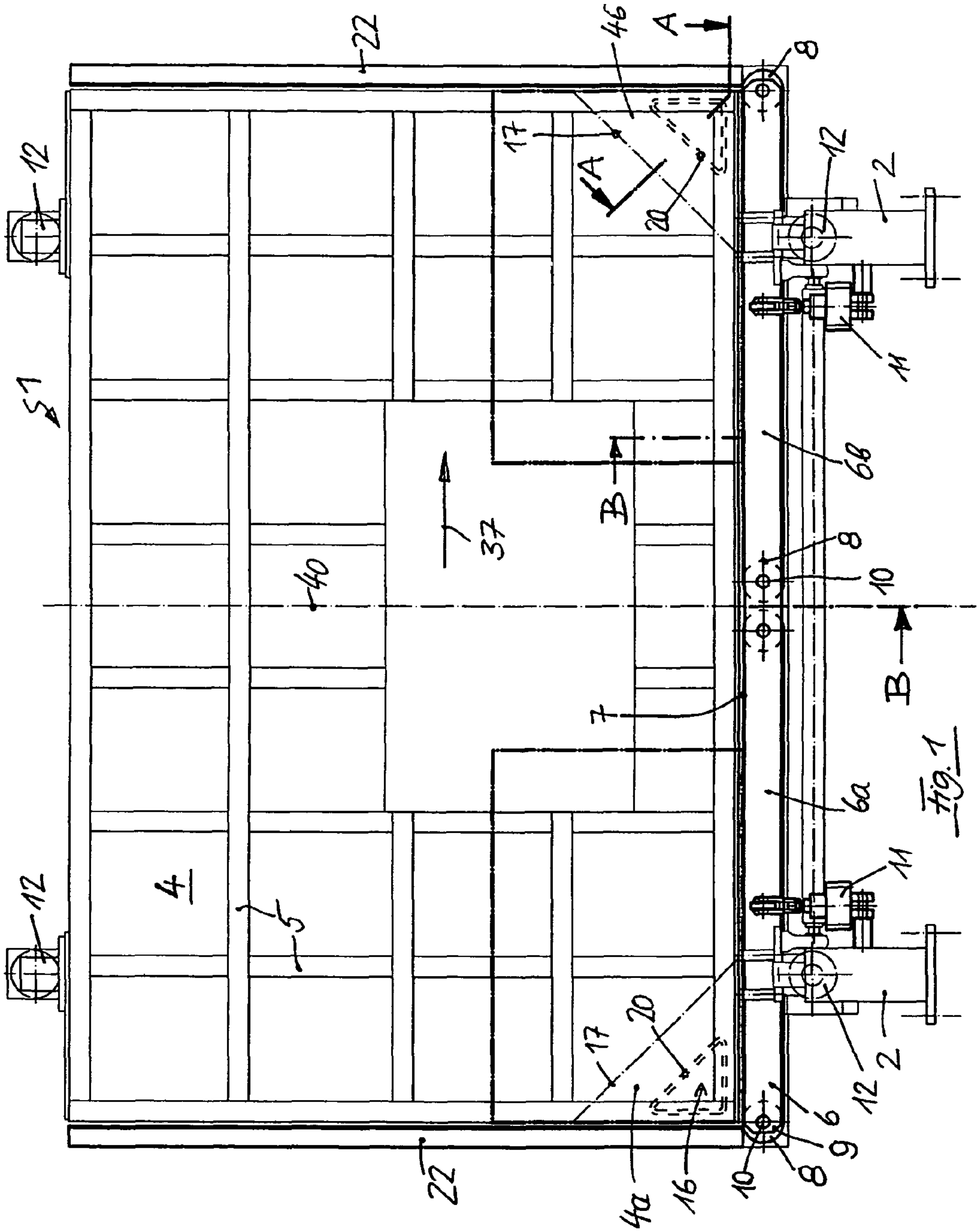
FIG. 1 shows a device for assembling, filling with gas and for pressing insulating glass panes, viewed at a right angle relative to the conveying direction.
Figure 2:
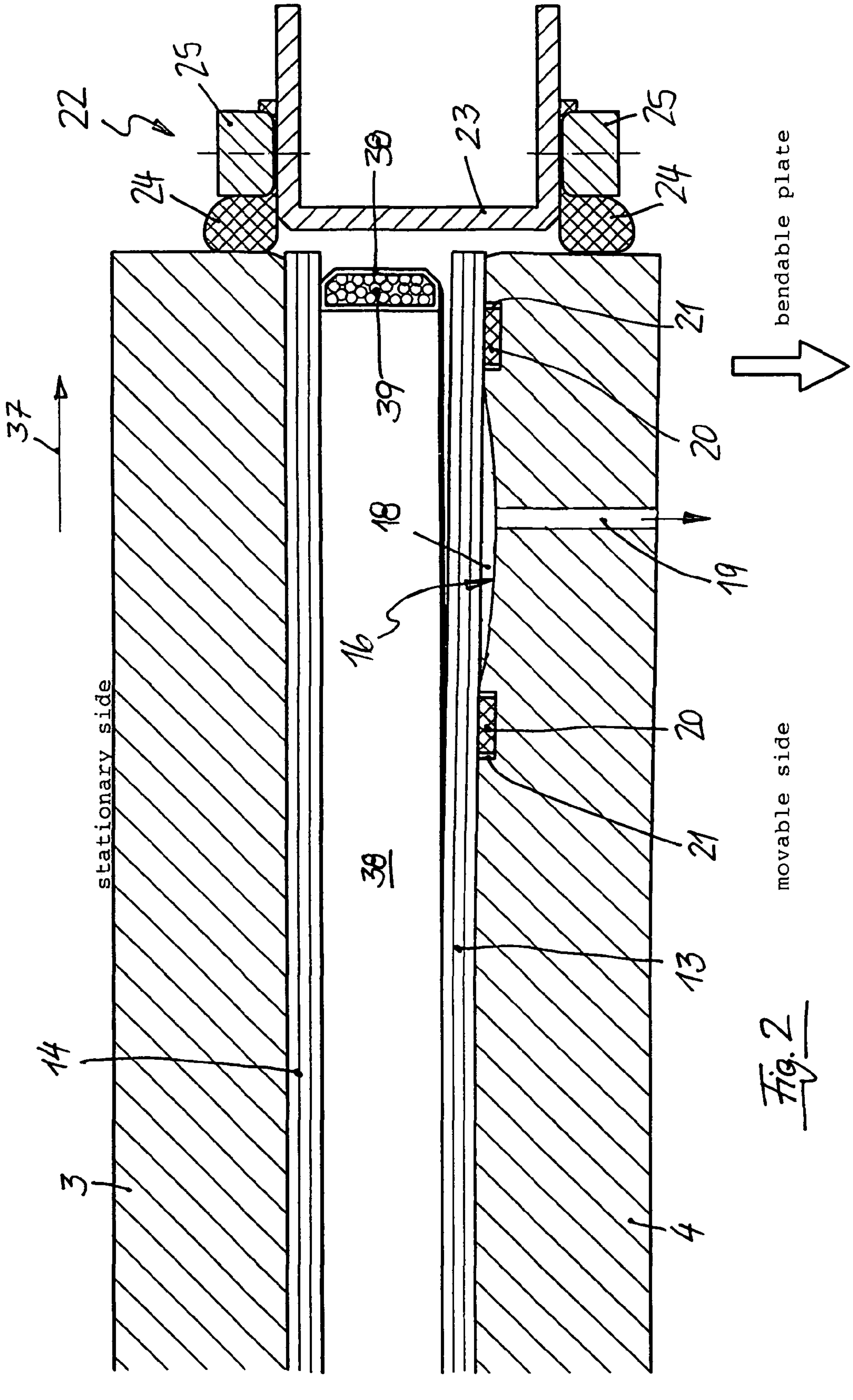
FIG. 2 shows a section taken along line A-A illustrating a detail of the device of FIG. 1.

FIGS. 1 and 2 show a device 1 according to the invention comprising, on a frame 2, two pressure plates 3 and 4 with flat front surfaces that face each other, while their rear surfaces are stiffened by a framework 5.

Below the lower edge of the pressure plates 3 and 4, there is provided a horizontal conveyor 6 that consists of two sections 6*a* and 6*b* arranged one behind the other. Arranged in each section 6*a* and 6*b* are two rollers 8, one of which is driven, with an endless belt 7 carried on the rollers. The rollers 8 are seated in a horizontally extending girder 9 and are provided with axes 10 extending at a right angle relative to the flat front surface of the pressure plates 3 and 4. The girder 9 extends over both sections 6a and 6b of the horizontal conveyor and is fixed on the frame 2 by means of two pivoting devices 11. The structure and function of the pivoting devices 11 will be explained in more detail with reference to FIGS. 3 to 10. The upper run is supported in order to prevent sagging of the upper run of the belt 7. To this end, a supporting rail is disposed on the girder 9 for each of the two belts 7, which supports the upper run of the belt 7 in sliding relationship. In the illustration of FIG. 1, the supporting rail is hidden behind the girder 9 and, accordingly, is not visible.

The pressure plates 3 and 4 are arranged one parallel to the other and are connected by four synchronously drivable arrangements each consisting of a spindle and a spindle nut. By driving the spindles or the spindle nuts it is possible to displace the one pressure plate 4 relative to the other pressure plate 3 in parallel to itself and at a right angle relative to the flat front surface of the pressure plates 3 and 4. One of the pressure plates is stationary in this arrangement, for example the pressure plate 3 which will be described hereafter as the first pressure plate.

The pressure plates 3 and 4 are inclined relative to normal by an acute angle of 6°, for example, so that a glass panel 13 standing on the belt 7 can be leaned against one of the pressure plates 3, 4, conveniently against the stationary first pressure plate 3, in full-surface contact with the latter.

Both pressure plates 3 and 4 comprise openings 15, for example bores, which are distributed over the pressure plates 3, 4 and through which air can be selectively blown in or drawn off by means of a blower, not shown, which is part of the device 1.

In order to assemble, fill with a gas different from air and press an insulating glass pane in the device 1, the device 1 may be part of a production line that comprises one or more stations preceding the device 1 and one or more stations following the device 1, which stations likewise comprise a horizontal conveyor on which glass panels can be transported into the device at the same level and with the same inclination as shown in FIG. 1, and on which completely assembled insulating glass panes can be transported out of the device 1.

The movable pressure plate 4, which will be described hereafter as the second pressure plate, is provided at its two lower corners with a suction device 16 which has its intake end aligned with the flat front surface of the second horizontal conveyor 4 and directed against the first pressure plate 3. Each of the suction devices 16 is integrated in a triangular section 4a or 4b, respectively, of the second pressure plate 4 which is seated for pivotal movement about a line, that will be described hereafter as bending line and that intersects the horizontal edge and the vertical edge of the second pressure plate 4 at an angle of, conveniently, 45°. The sections 4a and 4b with the integrated suction devices 16 can be pivoted by an operating member, for example a fluid cylinder articulated on the rear side of the second pressure plate 4, from a first position in which the front of the suction device is aligned with the remaining front surface of the second pressure plate 4, into a second position in which the triangular section 4a, 4b with the integrated suction device 16 is pivoted about the bending line 14 toward the rear by a certain amount, i.e. away from the opposite first pressure plate 3. As shown diagrammatically in FIG. 2, the section device 16 may be formed by a shallow depression 18 with triangular contour in the front surface of the second pressure plate 4. A section line 19, opening into the depression 18, serves for producing a partial vacuum in the depression 18 when the depression 18 is covered by a glass panel 13. The depression 18 is surrounded by a seal 20, fitted in a groove 21 in the second pressure plate 4, which projects beyond the latter's side as long as the first glass panel 13 has not been attracted by suction.

A sealing means 22, provided on each of the two upright edges of the pressure plates 3 and 4, extends from the upper run of the belt 7 to the upper edge of the pressure plates 3 and 4 and can be displaced from an active position, in which it bridges and seals the gap between the two pressure plates 3 and 4 extending from the bottom to the top, as illustrated in FIG. 2, into an ineffective position. In the ineffective position, the gap between the pressure plates 3 and 4 is released by the sealing means 22 so that the glass panels 13, 14 can be transported into the space between the pressure plates 3 and 4 and an assembled insulating glass pane can be carried off from that space. The sealing means 22 can be arranged on one of the two pressure plates 3, 4, preferably on the fixed pressure plate 3. Their ineffective position is not shown in the drawing.

FIG. 2 shows an example of a possible structure of such a sealing means 22: The illustrated sealing means 22 comprises a strip 23 of U-shaped profile with a sealing section 24 arranged on each side and fastened on the one or the other leg of the strip 23 by a clamping strip 25.

The structure of the pivoting devices 11 is illustrated in more detail in FIGS. 3 to 10. Mounted on the two long sides of the girder 9 is a bearing 26, 27. A first lever 28 has one of its end articulated on the bearing 26 and its other end 286a articulated on the frame 2. A second lever 29 has its one end articulated on the bearing 27 and its other end 29a likewise articulated on the frame 2. The point where the end 26a of the lever 26 is articulated on the frame 2 is positioned at a higher level than the point where the end 29a of the lever 29 is articulated on the frame 2. The axes 41 and 42 about which the lever 29 and, thus, the horizontal conveyor 6 can be pivoted, extend in parallel to the conveying direction 37. The girder 9, the levers 28 and 29 and the frame 2 form together a four-bar linkage the shape of which can be varied by a fluid cylinder 30 which has one end articulated on the bearing 26 so that the bearing 26, the lever 28 and the fluid cylinder 30 have a common articulation. The other end 30a of the lever 30 is articulated on the frame 2. The fluid cylinder 30 is a short-stroke cylinder.

The bottom surface of the first pressure plate 3 is provided with a seal 31, extending in the conveying direction 37, in the form of a hollow section made from an elastomeric material. Mounted on the bottom surface of the second pressure plate 4 is an elongated means 32 for delivering a gas different from air. That means comprises a strip 33 of L-shaped cross-section the longer leg of which is in tight contact with the bottom surface of the second pressure plate 4, whereas the shorter leg points in downward direction. Mounted on the lower end of the shorter leg is a resilient sheet 34 that extends in parallel to the long leg of the strip 33 over the full length and width thereof. Between the ends of the long leg, remote from the short leg of the strip 33, and the resilient sheet 34, there is provided a strip 35 of a compressible gas-permeable material which is connected by means of an adhesive to at least one of the two elements, i.e. either the strip 33 or the sheet 34. The air-permeable material from which the strip 35 is made may be an open-cell foamed material or a loose felt, for example. The strip 33, the sheet 34 and the strip 35 delimit a channel 36 into which a gas different from air, especially a heavy gas, for example argon, can be introduced from a compressed-gas cylinder, for example.

Figure 3:
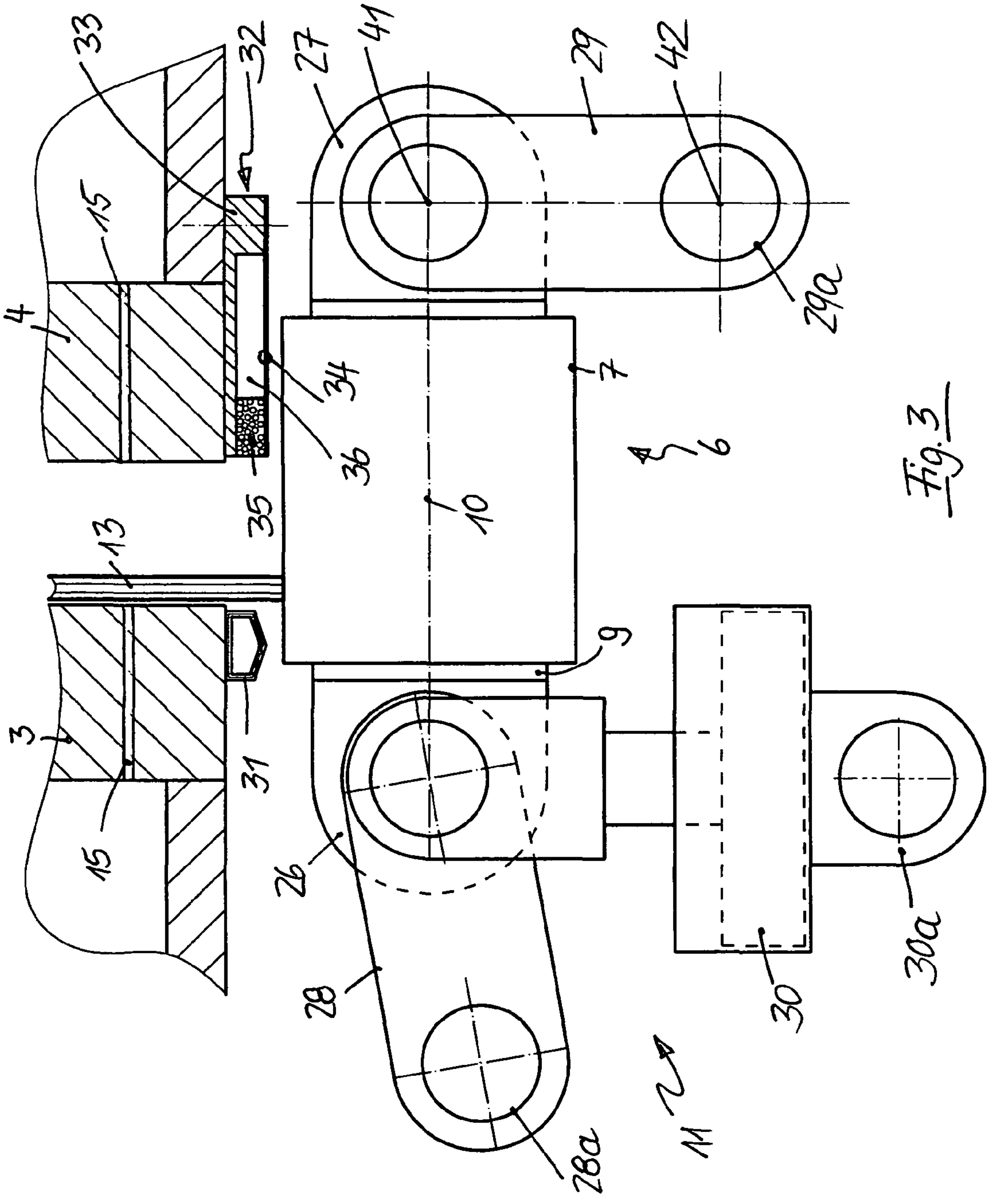
FIGS. 3 to 10 show a lengthwise section along line B-B through the device illustrated in FIG. 1 in different phases of the method for assembling, filling with gas and for pressing insulating glass panes.

The illustrated device 1 operates as follows:

A first glass panel 13, standing on the belt 7 and leaning against the first pressure plate 3, is transported by the horizontal conveyor 6 in the conveying direction 37 into the space between the two pressure plates 2 and 3—see FIG. 3—until its forward edge reaches the forward edge of the pressure plate 3. There it is stopped in the position illustrated in FIG. 2 for a second glass panel 14.

Figure 4:
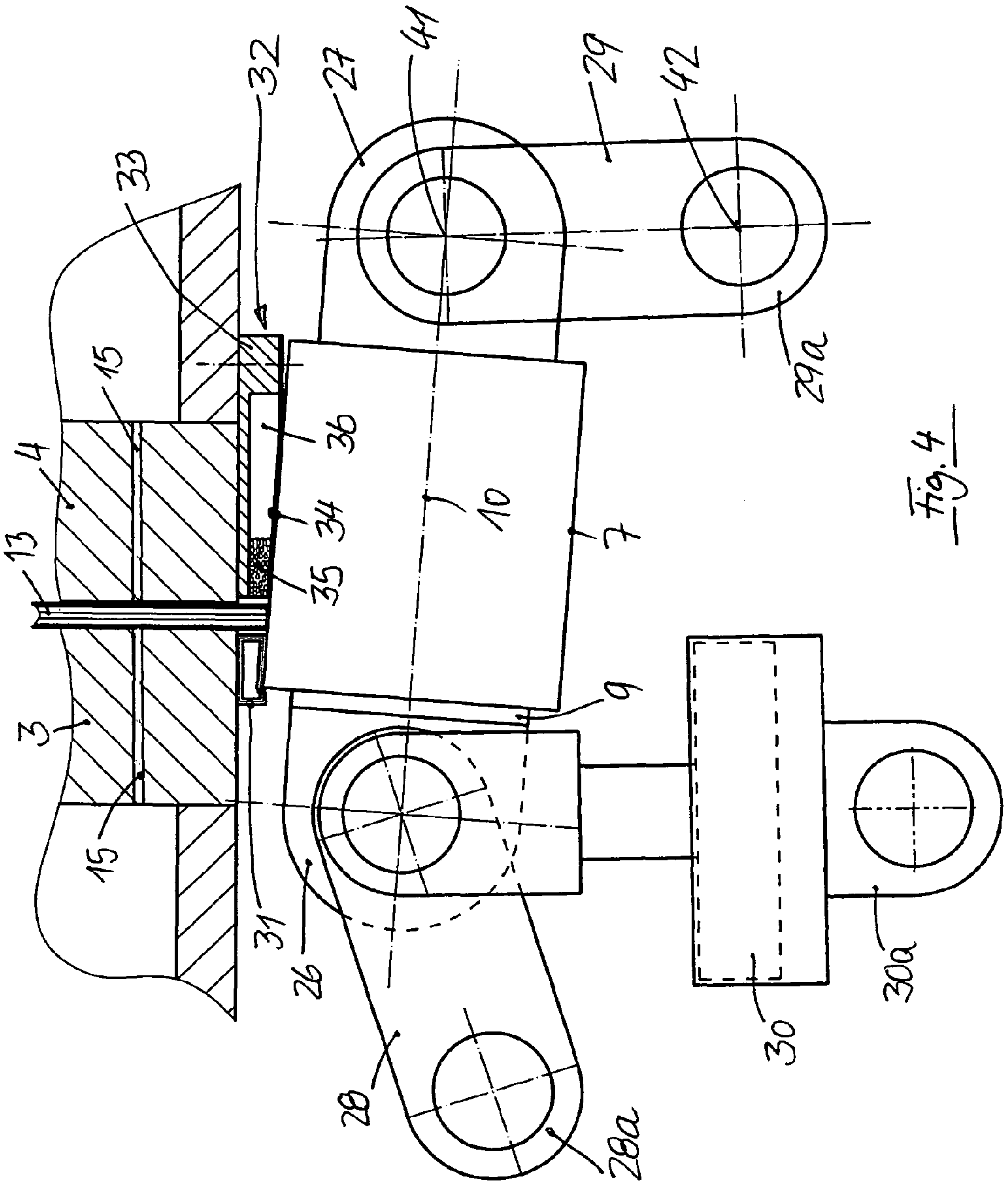
Figure 5:
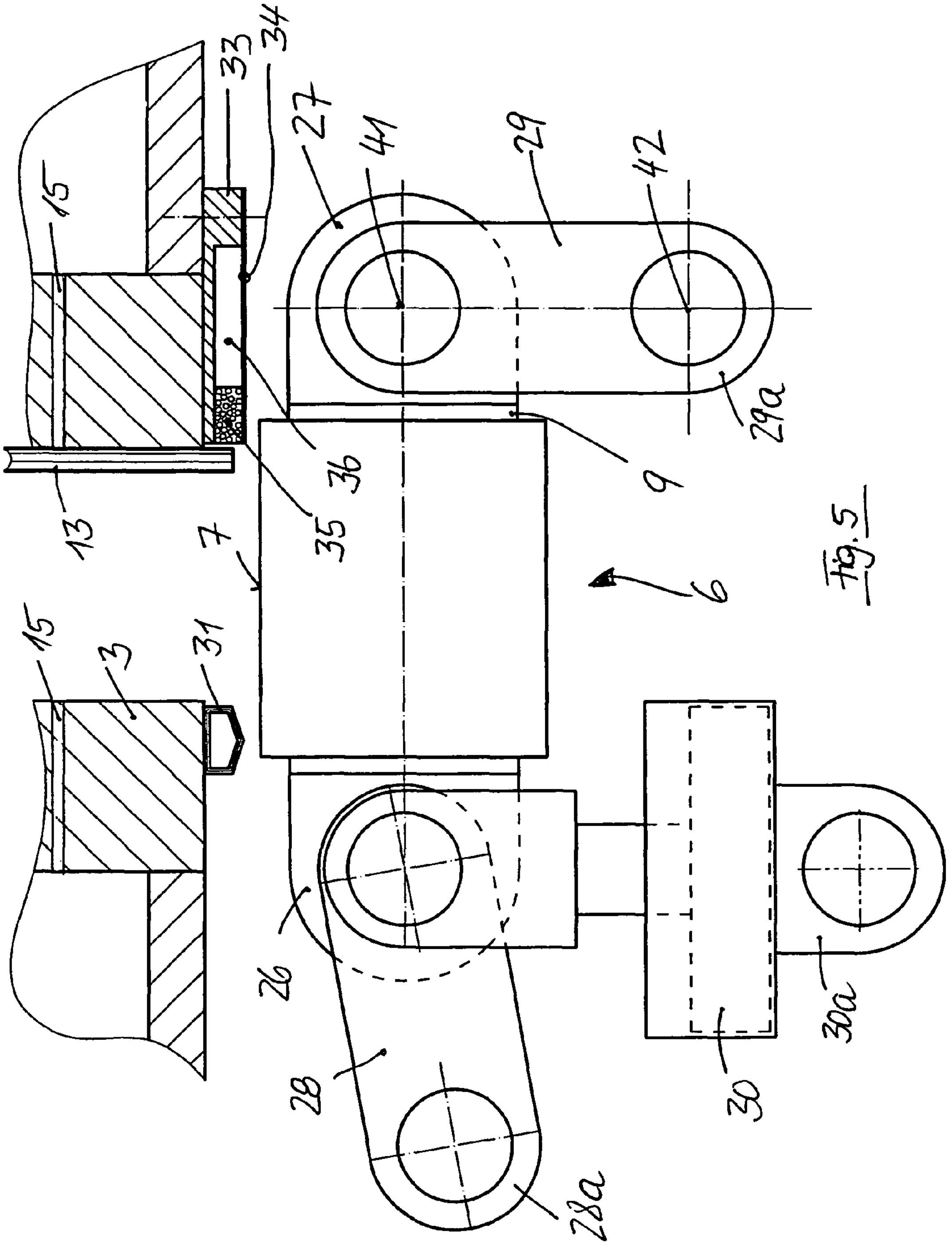

By operating the fluid cylinder 30, the horizontal conveyor 6 is then pivoted in upward direction into the position illustrated in FIG. 4 (the filling position). Thereafter, the second pressure plate 4 is approached to the first pressure plate 3 by operating the arrangements 12, comprising the spindle and the spindle nut, until it gets into contact with the first glass panel 13. Using the openings 15 provided in the pressure plate 4 the glass panel 13 is then attached by suction, whereafter the second pressure plate 4 is removed again from the first pressure plate 3, entraining the first glass panel 13. By operating the fluid cylinder 30, the horizontal conveyor 6 is then pivoted back to its filling position—see FIG. 5—which it also occupies in FIG. 3. The first glass panel 13 now is suspended on the second pressure plate 4 at a spacing from the belt 7.

Figure 6:
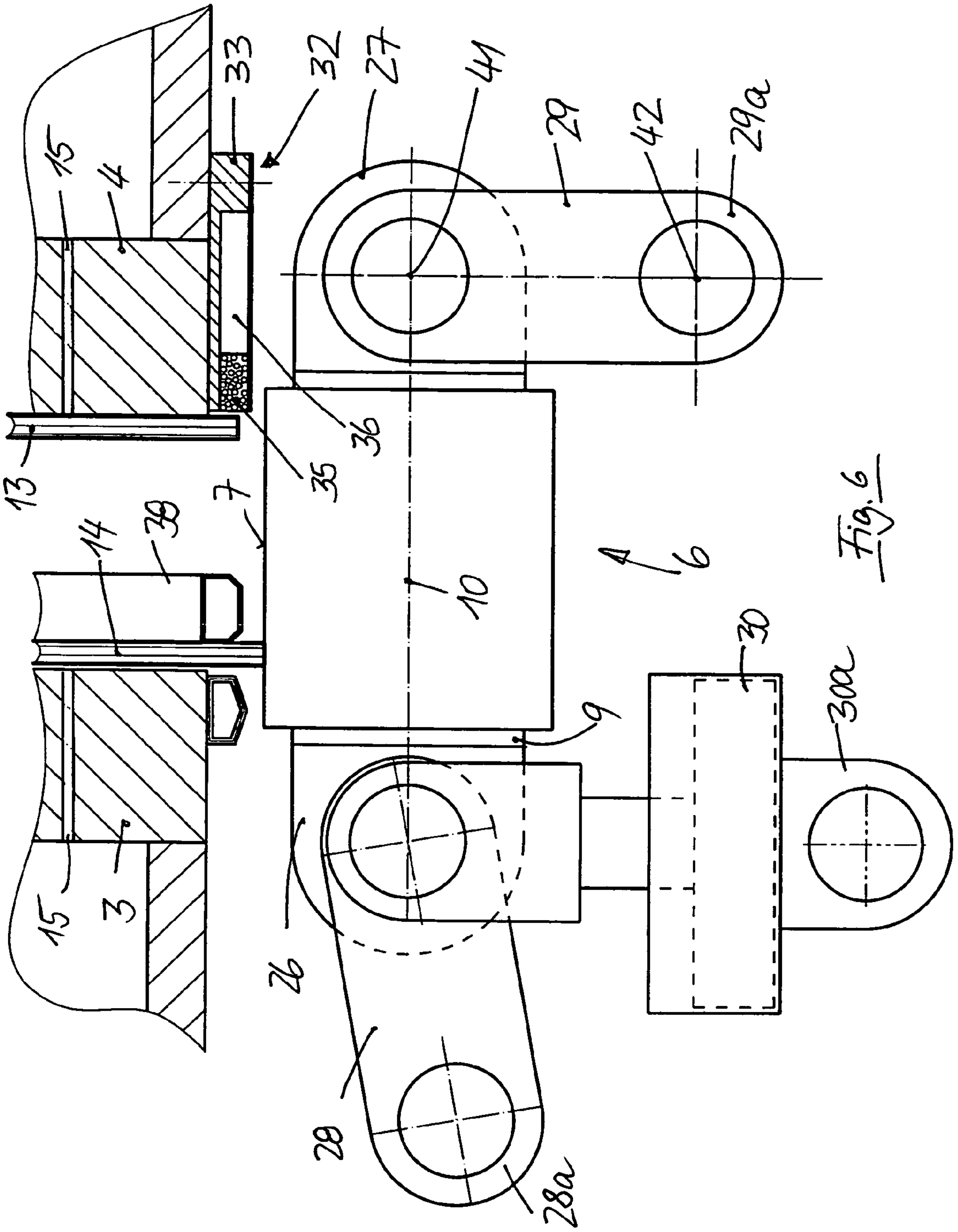

Now, the second glass panel 14, standing on the belt 7 and leaning against the pressure plate 3, is transported into the device 1—see FIG. 6—and is positioned at the same point where the first glass panel 13 had been positioned before. The second glass panel 14 carries on its side facing the first glass panel 13 a frame-shaped spacer 38 which in the illustrated example consists of a metallic hollow-section bar that contains a drying agent 39. The spacer 38 is coated with a bonding sealing compound on both of its flanks that face the two glass panels 13 and 14.

Figure 7:
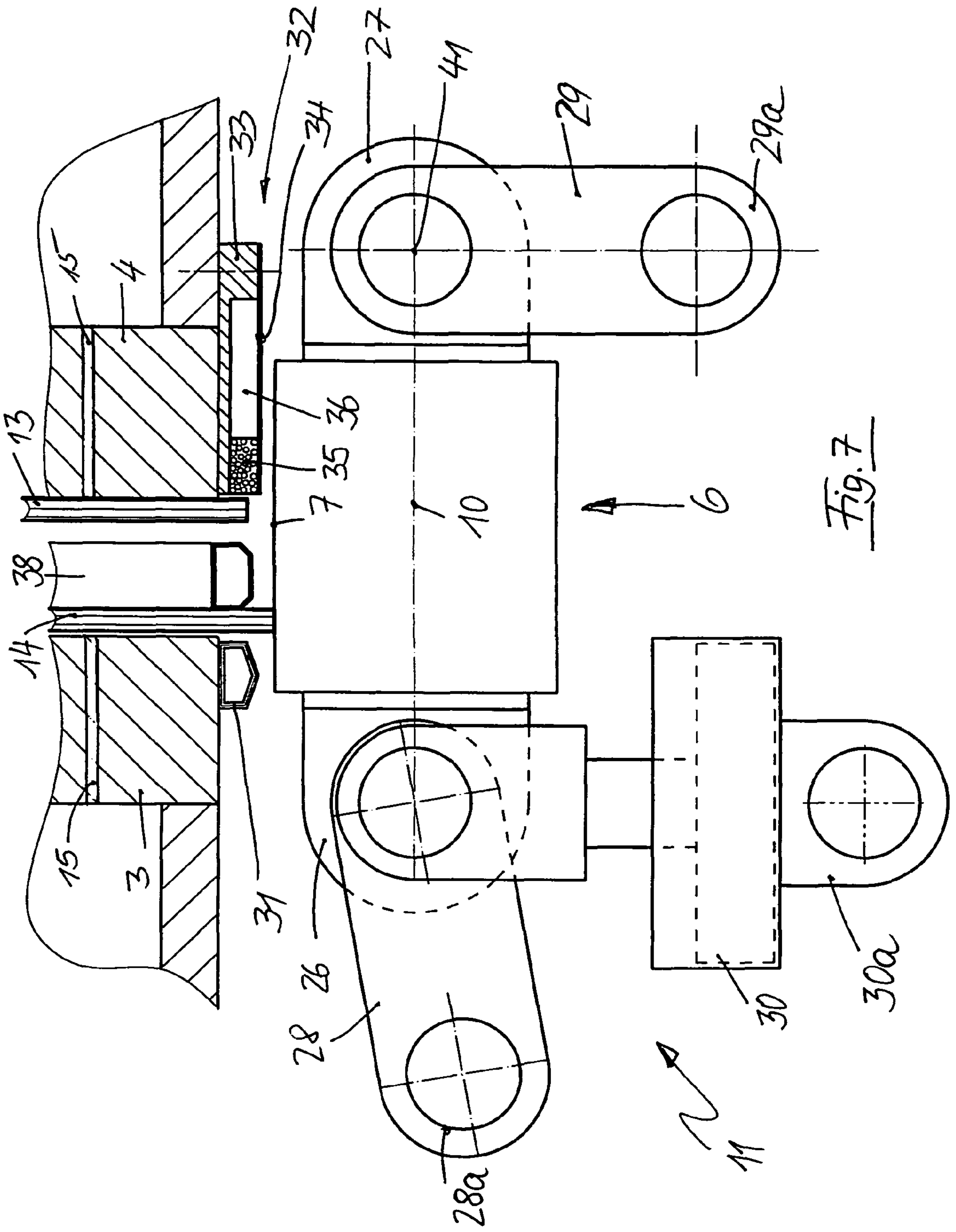
Figure 8:
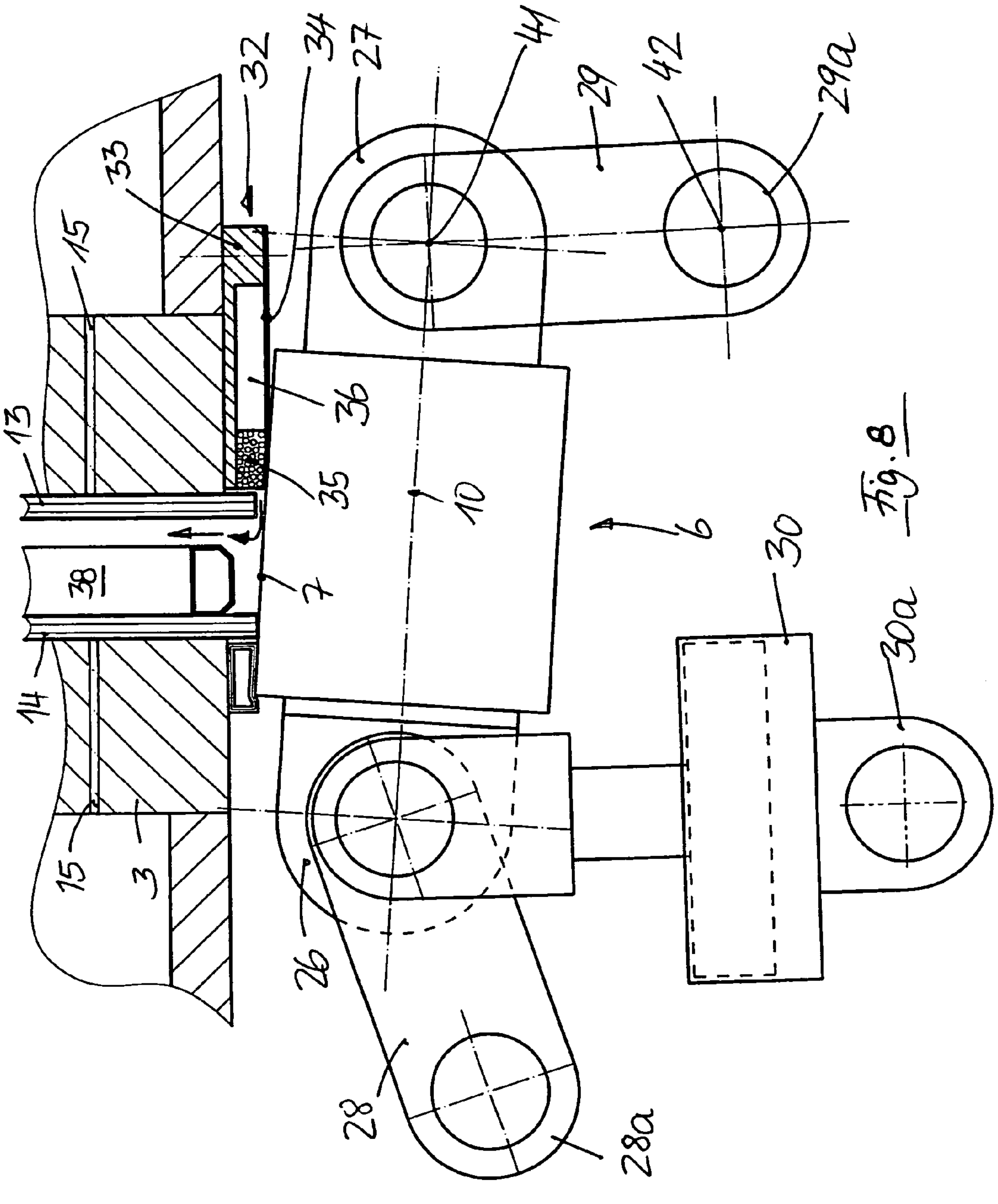

The second pressure plate 4 now is approached to the first pressure plate 3 until a small spacing of 2 mm for example is left between the first glass panel 13 and the spacer 38, see FIG. 7. By operating the fluid cylinder 30, the horizontal conveyor now is pivoted again to the position illustrated in FIG. 8 in which the second glass panel 14 is lifted by the same amount by which the glass panel 13 had been lifted before so that the two glass panels 13, 14 are now disposed in conforming arrangement one opposite the other. That position of the horizontal conveyor 6 is described herein as the filling position because in that position a gas different from air can be filled into the space between the two glass panels 13 and 14. In that position, the upper run of the belt 7 is in contact with the seal 31, the latter being deformed by the pressure exerted by the belt 7 on the seal 31. Further, in the filling position, the belt 7 is urged against the bottom surface of the sheet 34 in the area of the porous strip 35, whereby the strip 35 is compressed while a gap remains between the belt 7 and the lower edge of the first glass panel 13. The action of the belt 7 on the seal 31, the lower edge of the second glass panel 14 and the bottom surface of the sheet 34 has the effect to seal the space between the glass panels 13 and 14 toward the bottom.

The sealing means 22 are applied against the forward and rear edges of the pressure plates 3 and 4. This creates a chamber between the pressure plates 3 and 4 that encloses the space between the glass panels 13 and 14 and that is closed on three sides, namely toward the front, toward the bottom and toward the rear; at the joints between the two sections 6*a* and 6*b* of the horizontal conveyor 8, additional sealing may be effected, if necessary, for example by the use of an adapter that can be fitted in the gusset between the two belts 7. Now, a gas different from air is introduced through the channel 36, flows through the porous strip 36 and through the gap between the belt 7 and the lower edge of the first glass panel 13 and into the space between the two glass panels, or the chamber enclosing that space, during which operation the strip 35 acts to homogenize the flow. The gas different from air, which generally will be heavier than air, displaces the air present in the chamber, which is sealed on three sides, toward the top. Once a predefined filling level has been reached, which fact can be determined by a probe or can be calculated from predefined dimensions of the insulating glass pane to be formed, the second pressure plate 4 is approached to the first pressure plate 3 up to a spacing conforming with the predefined thickness of the insulating glass pane to be formed. The second glass panel 14 then abuts against the bonding sealing compound of the spacer 38 so that the spacer 38 comes to bond to both glass panels 13 and 14 while the bonding sealing compound is compressed.

Figure 9:
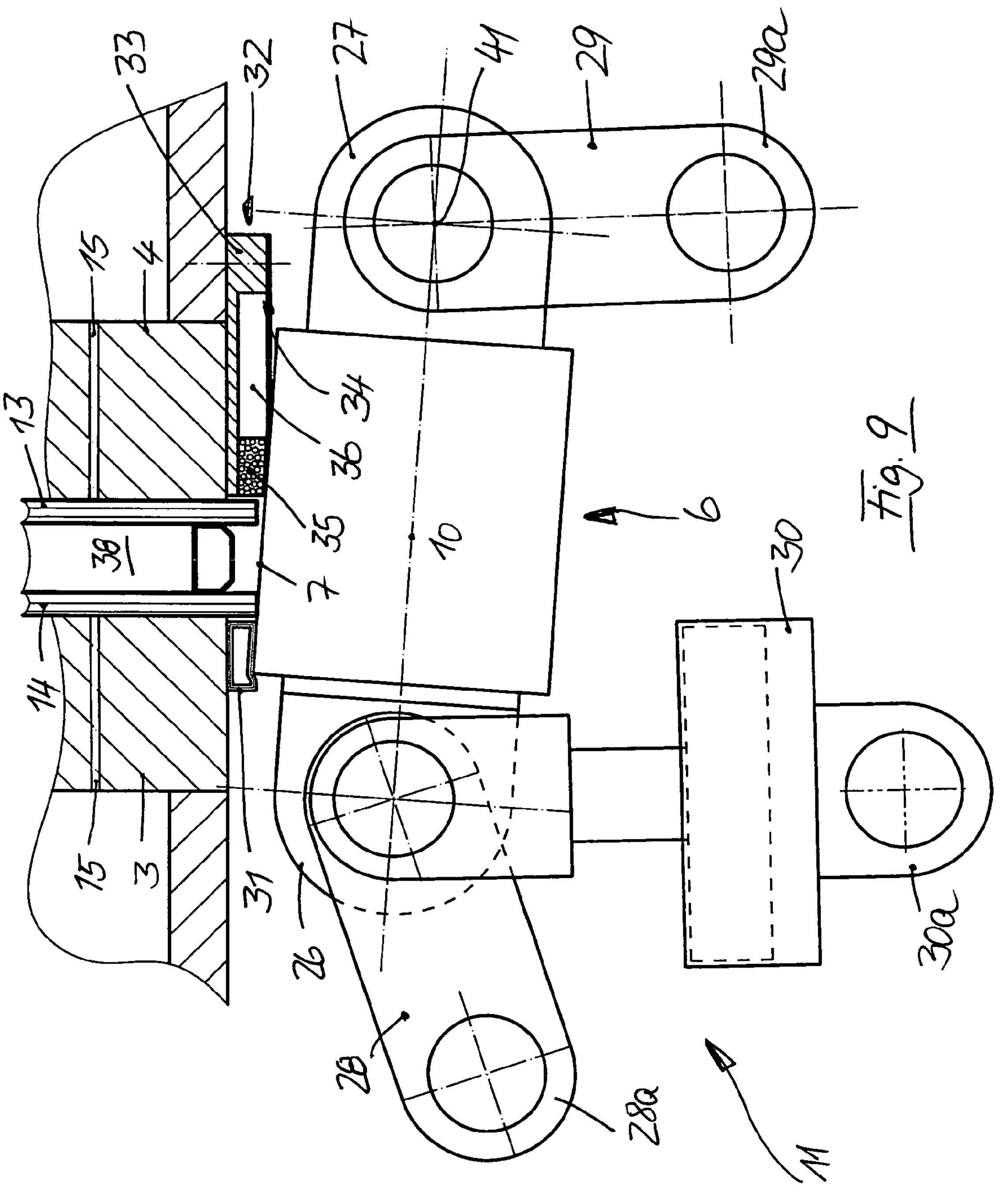

In order to prevent any undesirable overpressure from forming in the insulating glass pane during the pressing operation, the forward lower corner of the first glass panel 13 may be bent a little in outward direction before the insulating glass pane is compressed, which operation is illustrated in FIG. 2. To this end, one initially activates the suction means 16 to attract the first glass panel 13 in the area of its lower corner so firmly that the necessary bending force can be transmitted. Thereafter, one activates an actuator member for bending the section 4*a* of the pressure plate 4, carrying the suction means 16, in outward direction. The actuator member may consist of a fluid cylinder arranged on the outside of the pressure plate 4. Once the section 4*a* has been bent to the outside, the flat area of the pressure plate 4 is approached to the pressure plate 3 up to a distance conforming with the thickness of the insulating glass pane to be formed, whereby the insulating glass pane is pressed together, except for the bent-off portion at the lower corner of the first glass panel 13. The insulating glass pane is still open in that area and as long as this is the case venting can occur during compression of the insulating glass pane. Once this has been done, the section 4*a* is restored to its unbent condition, and the insulating glass pane is finally pressed in the area of that section 4*a* as well. This state is shown in FIG. 9.

Figure 10:
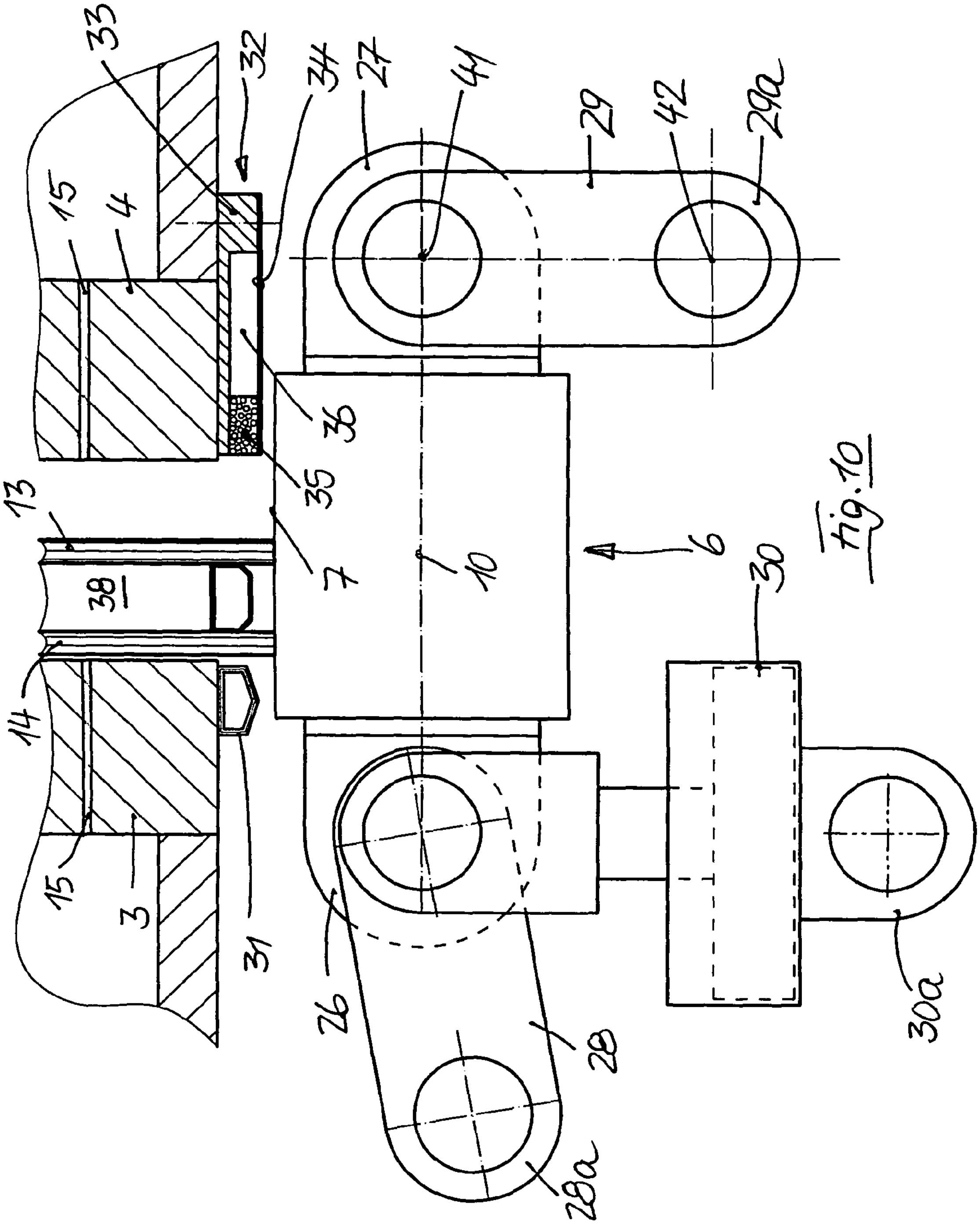

After pressing of the insulating glass pane the first glass panel 13 need no longer be retained on the second pressure plate 4 by suction. Suction is therefore stopped. Then the second pressure plate 4 is removed from the first pressure plate 3, and preferably simultaneously the horizontal conveyor 6 is pivoted back to its conveying position, by operation of the fluid cylinder 30, as illustrated in FIG. 10. The two glass panels 13, 14, now assembled to an insulating glass pane, are now again positioned at the level at which they had been conveyed into the device as separate glass panels. They are now transported out of the device 1 as an assembled insulating glass pane.

The illustrated device 1 is not only suited for assembling, filling with a gas different from air and for compressing one insulating glass pane, but is additionally adapted for assembling two insulating glass panes at a time. It therefore has a mirror-symmetrical design, related to its center plane 40 extending transversely to the conveying direction 37. It is thus possible to simultaneously assemble, fill with gas and to press two insulating glass panes of a length up to half the length of the pressure plates 3, 4. For this purpose, the described method is conveniently modified in such a way that initially a first glass panel for a first insulating glass pane is transported up to the forward edge of the pressure plates, whereafter a first glass panel for a second insulating glass pane is conveyed into the device 1 and positioned at the rear edge of the pressure plates 3, 4, as illustrated in FIG. 1. In order to permit such positioning of the panels, one independently of the other, the horizontal conveyor 6 is subdivided into the two sections 6*a* and 6*b*, which selectively can be driven separately and in synchronism. Once the two first glass panels have been positioned, they are attached on the movable pressure plate 4 by suction. Thereafter, two second glass panels, each provided with a spacer, are correspondingly positioned in the described way. The other operations then all take place simultaneously for the two insulating glass panes, as has been described by way of example for a single insulating glass pane.

In order to keep the consumption of the gas different from air small, the device should not be flooded with the gas different from air over its full length; instead, separate sealing means should be provided near the vertical edges of the glass panels 13, 14 in the device 1 which sealing means come to act at the vertical edges or near the vertical edges of the glass panels 13, 14. Those sealing means may consist, for example, of means that can be advanced from the forward surface of one of the pressure plates 3, 4 to the opposite pressure plate for partitioning the space between the pressure plates 3, 4 into smaller chambers. For glass panels 13, 14 of different lengths, several such extendable seals may be distributed over the length of the pressure plates 3, 4.

The device 32 for delivering the gas different from air, extending over the length of the first pressure plate 4, is subdivided into sections that can be closed off individually at the points where seals can become active between the pressure plates 3, 4 so as to restrict of the delivery of the gas different from air to the chambers that have been closed off by the seals.

LIST OF REFERENCE NUMERALS

1. Device
2. Frame
3. First pressure plate
4. Second pressure plate
4*a*. Section of 4
4*b*. Section of 4
5. Framework
6. Horizontal conveyor
6*a*. First section of 6
6*b*. Second section of 6
7. Belt
8. Rollers
9. Girder
10. Axes of 8
11. Pivoting device
12. Arrangement comprising a spindle and a spindle nut
13. First glass panel
14. Second glass panel
15. Openings in 2, 3
16. Suction device
17. Bending line
18. Depression
19. Suction line
20. Seal
21. Groove in 4
22. Sealing means
23. Strip
24. Sealing section
25. Clamping strip
26. Bearing
27. Bearing
28. First lever
28*a*. End of 28
29. Second lever
29*a*. End of 29
30. Fluid cylinder
30*a*. End of 30
31. Seal
32. Gas delivery means
33. Strip
34. Sheet
35. Strip
36. Channel
37. Conveying direction
38. Spacer
39. Drying agent
40. Center plane
41. First axis
42. Second axis

The invention claimed is:

1. Method for the assembly of insulating glass panes that are filled with a gas different from air, comprising the steps of:

Arranging a first glass panel and a second glass panel provided with a spacer in a vertical or inclined position so that they are placed one opposite the other without the first glass panel getting into contact with the spacer to form a glass panel arrangement;

forming a chamber that encloses a space between the glass panels by providing a belt at a lower edge of the glass panel arrangement, which belt closes the chamber at its bottom, and by arranging adjacent each of upright edges of the glass panel arrangement at least one sealing means that extends from a point above the belt down to the belt for forming a front and a rear seal of the chamber;

introducing the gas different from air into the chamber from below and forming an insulating glass pane, by approaching the glass panels one to the other when a desired filling degree or filling level has been reached to form an insulating glass pane, wherein during introduction of the gas different from air one of the first and second glass panels is held at a spacing from the belt to establish a gap between the belt and a lower edge of said one of the first and second glass panels and the gas different from air is introduced into the chamber through said gap; wherein the method is carried out between a first plate and a second plate, said second plate holding said one of the first and second glass panels and the flow of the gas different from air is homogenized before said gas is introduced through said gap.

2. The method as defined in claim 1, wherein the belt is used as a conveying member of a horizontal conveyor.

3. The method as defined in claim 2, wherein said first and second plates are aligned vertically or inclined and can be varied with respect to their spacing one from the other, of a device for filling with gas and for assembling insulating glass panes in which the horizontal conveyor, is arranged near a lower edge of the first plate and the lower edge of the second plate;

that the glass panels are conveyed into a space between the plates standing on the belt and leaning against one of the plates;

that the glass panels are positioned between the two plates one opposite the other; and that prior to delivering the gas different from air the gap is produced between the belt and the lower edge of said one of the two glass panels held at said spacing from said belt.

4. The method as defined in claim 3, wherein the chamber is delimited by the glass panels, by the belt and by the at least two sealing means, the at least two sealing means being movable, that are spaced one from the other in the conveying direction, in that at least one of the sealing means is placed in front of the glass panel arrangement comprising the glass panels and at least one of the sealing means is placed behind the glass panel arrangement.

5. The method as defined in claim 3, wherein the at least two sealing means are movable and the chamber is delimited by the glass panels, by the belt and by the at least two movable sealing means that are applied against the upright edges of the glass panels.

6. The method as defined in claim 1, the gap between the lower edge of the first glass panel and the belt is produced by lifting said first glass panel off the belt.

7. The method as defined in claim 1, wherein the gap between the lower edge of the first glass panel and the belt is produced by pivoting the belt away from the lower edge of said first glass panel.

8. The method as defined in claim 1, wherein the glass panels are placed in registration one opposite the other.

9. The method as defined in claim 1, wherein prior to introducing the gas different from air the glass panels are placed in parallel one to the other.

10. The method as defined in claim 3, wherein both glass panels are in surface contact with the plates.

11. The method as defined in claim 1, wherein the gas different from air exits from a supply line arranged at the bottom edge of the second plate on which the first glass panel is held.

12. The method as defined in claim 11, comprising the steps of conveying the first glass panel into a space between two plates by driving the belt;

positioning the first glass panel in the space by stopping the drive of the belt in a position in which the first glass panel stands on the belt and leans against the first plate;

pivoting the belt about an axis parallel to its conveying direction, from a position in which an upper run of the belt extends at a right angle or approximately at a right angle to the two plates, whereby the first glass panel is lifted;

sucking the first glass panel to the second plate positioned opposite the first plate and removing the first glass panel from the first plate by increasing the spacing between the two plates;

pivoting the belt into its conveying position;

conveying the second glass panel, to which the spacer is bonded, into the space by driving the belt once more;

positioning the second glass panel in a position opposite the first glass panel in which the second glass panel stands on the belt and leans against the first plate, and its spacer faces the first glass panel;

lifting the second glass panel by pivoting the belt from its conveying position into a position, hereinafter referred to as the filling position, in which the second glass panel is placed in registration with the first glass panel and opposite the latter, and in which the gap is between the lower edge of the first glass panel and the upper run of the belt;

forming the chamber;

introducing the gas different from air into the chamber through a gas-permeable open celled foam member and the gap;

forming the insulating glass pane by reducing the spacing between the two glass panels releasing the second plate from the first glass panel and pivoting the belt into its conveying position; and conveying the insulating glass pane out of the space.

13. The method as defined in claim 12, wherein forming the chamber further comprises pivoting the belt into its filling position.

14. The method as defined in claim 12, wherein the axis about which the belt is pivoted extends on a side of the belt which is positioned below the second plate.

15. The method as defined in claim 12, wherein the belt is adopted to pivot about a second axis parallel to the other axis about which said belt pivots.

16. The method as defined in claim 3, wherein in addition to said first and second glass panels, a second pair of glass panels are arranged behind said first and second glass panels between the plates and wherein each pair of panels is simultaneously filled with the gas different from air and are simultaneously connected to form insulating glass panes.

17. The method as defined in claim 12, wherein the glass panels are positioned so that their forward upright edges extend at or near forward edges of the two plates and/or that their rear upright edges extend at or near rear edges of the two plates.

18. The method as defined in claim 2, wherein the upper run of the belt is supported over its full length, by a ledge.

* * * * *